United States Patent

Wallentin et al.

[11] Patent Number: 6,110,094
[45] Date of Patent: Aug. 29, 2000

[54] METHOD FOR FOLDING AN INFLATABLE AIRBAG FOR AN AIRBAG SYSTEM

[75] Inventors: Rainer Wallentin, Baldham; Thomas Weberpals, München, both of Germany

[73] Assignee: Autoliv Development AB, Sweden

[21] Appl. No.: 09/214,777

[22] PCT Filed: May 6, 1998

[86] PCT No.: PCT/EP98/02664

§ 371 Date: Jan. 8, 1999

§ 102(e) Date: Jan. 8, 1999

[87] PCT Pub. No.: WO98/51540

PCT Pub. Date: Nov. 19, 1998

[30] Foreign Application Priority Data

May 9, 1997 [DE] Germany ............................ 197 19 524

[51] Int. Cl.[7] .................................................. B31B 01/56
[52] U.S. Cl. .......................... 493/454; 493/471; 280/728.1
[58] Field of Search ...................... 493/243, 246, 493/454, 471; 53/118; 280/728.1, 743.1

[56] References Cited

U.S. PATENT DOCUMENTS

| | | |
|---|---|---|
| 4,286,954 | 9/1981 | McArthur et al. . |
| 5,240,282 | 8/1993 | Wehner et al. . |
| 5,492,367 | 2/1996 | Albright et al. . |
| 5,501,489 | 3/1996 | Folsom et al. . |
| 5,632,506 | 5/1997 | Shellabarger ........................ 280/728.1 |
| 5,694,737 | 12/1997 | Lunt et al. .............................. 53/118 |
| 5,775,733 | 7/1998 | Lunt et al. ........................... 280/743.1 |
| 5,899,490 | 5/1999 | Wipauramonton et al. ......... 280/743.1 |
| 5,944,342 | 8/1999 | White, Jr. et al. ................... 280/743.1 |

FOREIGN PATENT DOCUMENTS

| 06255437 | of 0000 | European Pat. Off. . |
|---|---|---|
| 8091166 | of 0000 | Japan . |

*Primary Examiner*—Eugene Kim
*Attorney, Agent, or Firm*—Robert W. Becker & Associates

[57] ABSTRACT

In a method for folding an airbag of an airbag system connected to a gas generator a tailored fabric consisting of two fabric layers defining the airbag volume is laid out flat and then engaged by a tool at the center of the length of the tailored fabric. At least a portion of the tailored fabric laid out flat is rolled in the direction toward the gas generator by rotating the tool so that the portion of the tailored fabric positioned at a side of the tool facing away from the gas generator is rolled into a double-layer roll. The tool is removed upon completion of the rolling process.

8 Claims, 3 Drawing Sheets

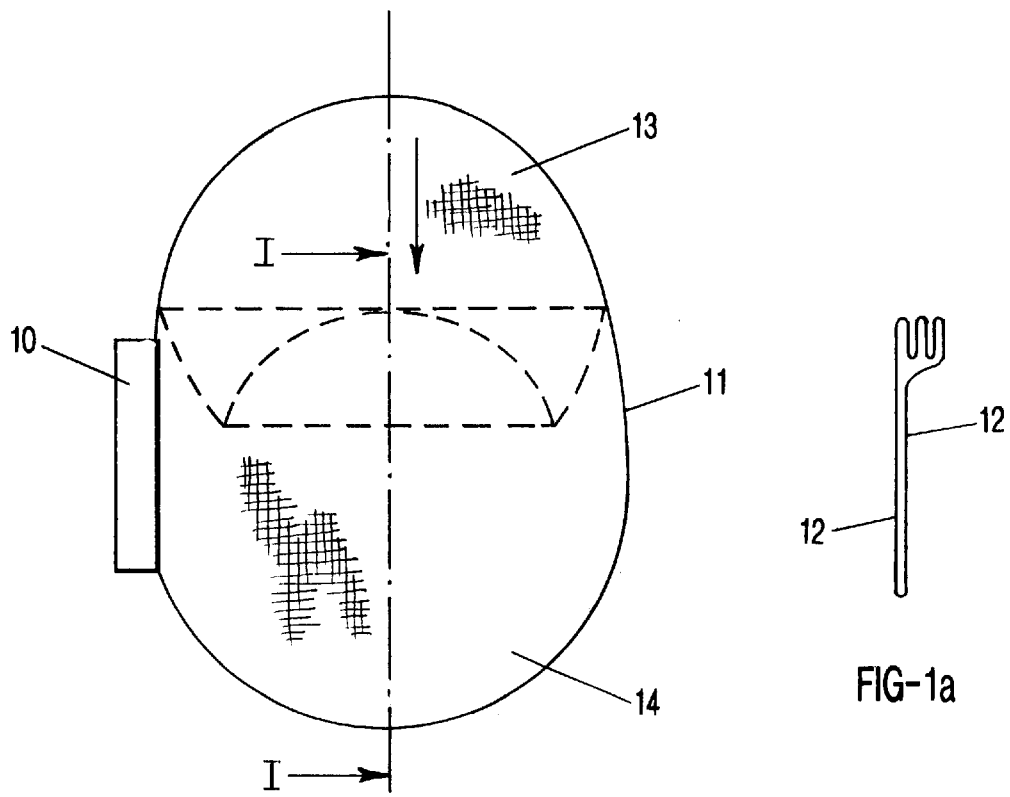
FIG-1
FIG-1a
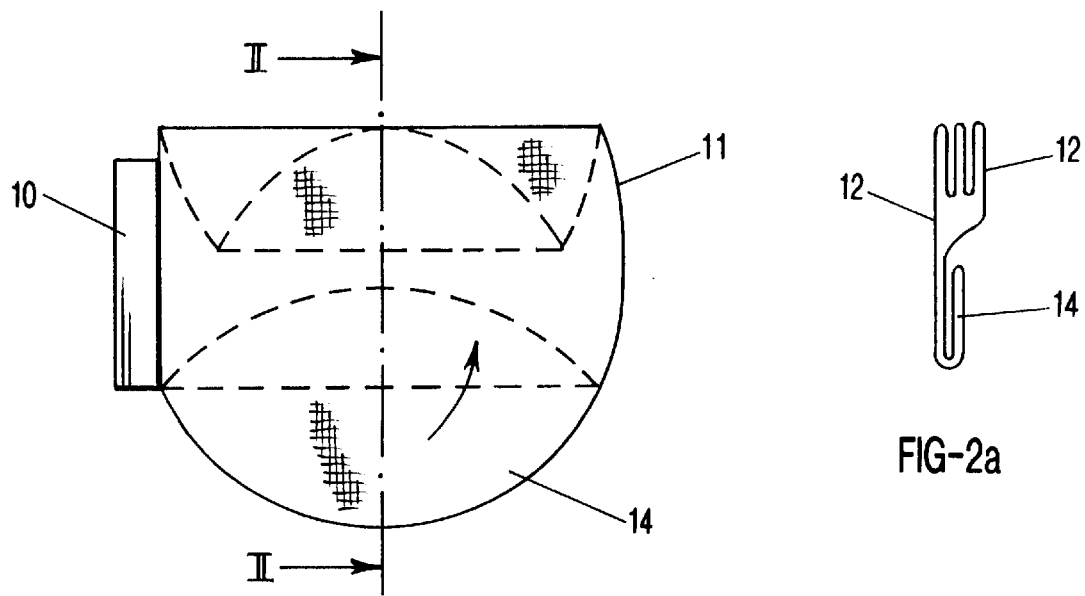
FIG-2
FIG-2a

METHOD FOR FOLDING AN INFLATABLE AIRBAG FOR AN AIRBAG SYSTEM

BACKGROUND OF THE INVENTION

The invention relates to a method for folding an airbag of an airbag system connected to a gas generator in which at least a part of the tailored, laid flat fabric consisting of two fabric layers defining the airbag volume is folded by rolling.

A method of the aforementioned kind is disclosed in U.S. Pat. No. 5,492,367. The described airbag to be folded has a cylindrical gas generator inserted in its longitudinal direction between fabric layers of the tailored fabric such that the tailored fabric has a projecting length on both sides of the gas generator which in the disclosed method of folding is selected to be asymmetric. In a first folding step, the portions of the fabric laid out flat at the end faces of the gas generator are folded inwardly in the direction toward the gas generator. The thus formed partially folded tailored fabric is then partially folded further by rolling whereby the portion having the greater length is rolled from the exterior in the direction toward the gas generator and, subsequently, the roll formed on one side of the gas generator is then covered by the fabric portion on the other side of the gas generator still laid out flat and then folded in a direction toward the gas generator.

This known folding method is relatively cumbersome due to the individual folding steps. Also, due to the different degree of folding of the fabric portions on opposite sides of the gas generator, the inflation of the airbag is not sufficiently fast. It is therefore an object of the invention to improve a folding method of the aforementioned kind such that the folding of the airbag is simplified to facilitate mounting and that the unfolding time of the folded airbag becomes shorter.

SUMMARY OF THE INVENTION

The solution to this object results, including advantageous embodiments and developments of the invention, from the contents of the claims which are following this description.

The invention is in principle based on the idea that the tailored fabric laid out flat is engaged at the center of its length by a tool and is rolled in a direction toward the gas generator so that the portion of the tailored fabric positioned at a side of the tool facing away from the gas generator, upon rotation of the tool in the direction toward the gas generator is pulled into the resulting roll such that a double layer roll of the folded airbag results and that at the end of the folding process the tool can be moved out of the roll. The invention has the advantage that due to the double layer rolled folding action performed by a tool mounting is simplified and is thus suitable for mechanization by the use of the tool. Due to the double layer roll the unfolding time of the folded airbag is shortened. With a suitable shape of the laid flat, tailored fabric, the invention in its simplest embodiment suggests, especially for a tailored fabric connected only to one side of the gas generator, to perform folding by rolling in the direction toward the gas generator without a previous partial folding step of portions of the tailored fabric.

According to one embodiment of the invention, it is suggested that the folding process is performed by a two prong fork as a tool whereby one of the prongs upon engaging the spread-out fabric is positioned above and the other prong is positioned below the fabric.

According to one embodiment of the invention, it is suggested that for a tailored fabric that extends to both sides of the gas generator both portions of the fabric adjacent to the gas generator are engaged by the tool and respectively transformed by rolling into the form of the double layer roll positioned on both sides of the gas generator.

According to one embodiment of the invention, the formation of a relief fold may be provided which is formed between the outer circumference of the gas generator and the outer circumference of the roll resting thereat, whereby, for example, the rolling process of the tailored fabric is stopped at a spacing to the gas generator and the portion of the laid flat, tailored fabric between the gas generator and the roll is then folded by being pushed together into the shape of a relief fold.

Inasmuch as the tailored fabric projects past the outer contour of the gas generator, according to one embodiment of the invention, it is suggested to fold the projecting portions of the tailored fabric inwardly or laterally and to further fold the partially folded tailored fabric by rolling as is, in principle, known from the aforementioned U.S. Pat. No. 5,492,367.

Inasmuch as the fabric is connected to a cylindrical gas generator, according to one embodiment of the invention, it is suggested that for a one-sided connection of the tailored fabric to the gas generator the outer lateral portions projecting past the longitudinal extension of the cylindrical gas generator are folded inwardly toward one another and that the multi-layer fabric package is then transformed into a double layer roll by a tool in the form of rolling tongs by rolling.

Instead of a simple folding over of a portion of the tailored fabric projecting past the gas generator, according to one embodiment of the invention, it may be provided that for a one-sided connection of the tailored fabric to the gas generator one of the portions projecting laterally past the longitudinal extension of the cylindrical gas generator is transformed into a multi-layer folded package by folding aids that engage parallel to the fabric layers and that the respective other projecting portion of the tailored fabric is then folded over inwardly, whereby afterwards the thus formed multi-layer fabric package is then transformed by rolling with a tool in the form of rolling tongs into the shape of the multi-layer roll.

BRIEF DESCRIPTION OF THE DRAWINGS

In the drawing one embodiment of the invention is represented which will be explained in the following. It is shown in:

FIG. 1 A plan view of a gas generator with tailored airbag fabric laid flat during a first partial folding step;

FIG. 1a The object of FIG. 1 in section along line I—I of FIG. 1;

FIG. 2 The partially folded tailored airbag fabric according to FIG. 1 in a plan view during a further folding step;

FIG. 2a The object of FIG. 2 in section along line II—II in FIG. 2;

FIG. 5 The finish-folded airbag in another embodiment with relief fold in a representation according to FIG. 4a.

DESCRIPTION OF PREFERRED EMBODIMENTS

Figure 3:
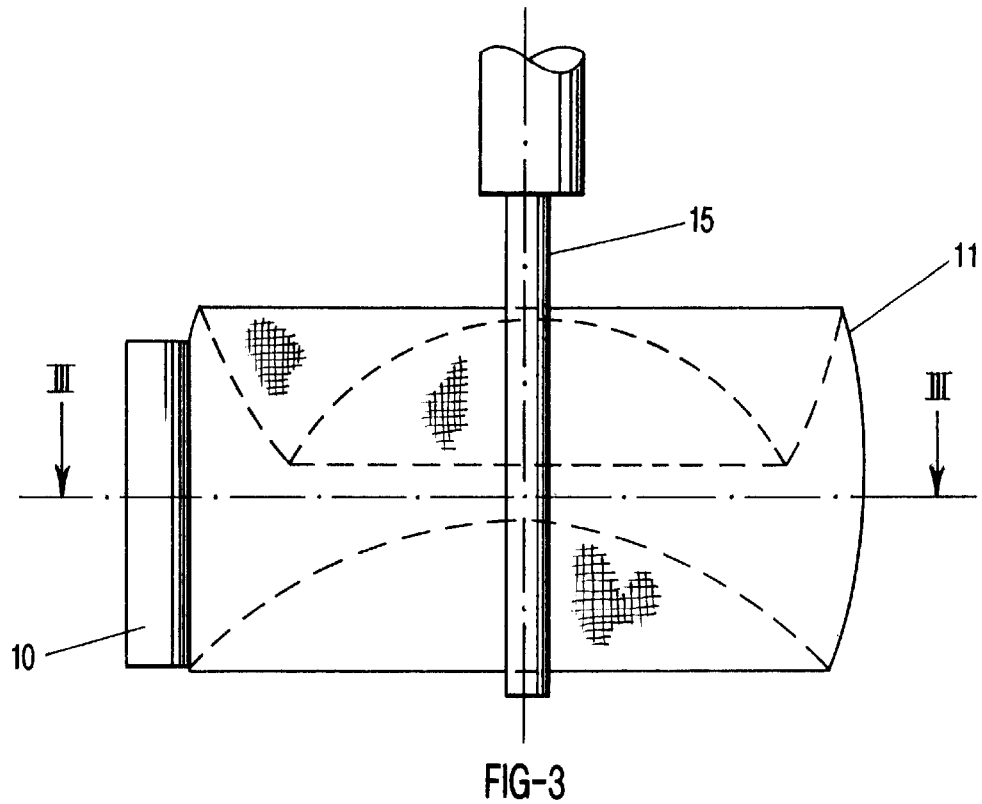
FIG. 3 The partly folded tailored airbag fabric of FIG. 2 in plan view at the start of the folding step by rolling.

A tailored fabric 11 of an airbag is connected to one side of a cylindrical gas generator 10 and is laid flat, as shown by the solid lines in FIG. 1. The fabric 11 is comprised, according to the sectional view of FIG. 1a, of two fabric layers 12 that define the airbag volume. The fabric 11 extends with a first portion 13 and a second portion 14 respectively past the longitudinal extension of the gas generator and thus projects from it.

In a first partial folding step the first projecting portion 13 of the tailored fabric 11 is folded by a non-represented folding aid in a direction so as to be parallel to the gas generator 10, whereby the folding aid engages the fabric layers in parallel, by pushing parts of the fabric layers 12 into the tailored fabric 11 so that the first projecting portion 13 of the tailored fabric 11 is folded as shown in FIG. 1 in a dashed line.

As can be seen in FIG. 2, the other projecting portion 14 of the fabric 11 is inwardly folded so that after completion of this partial folding step there are no portions of the tailored fabric 11 that project past the longitudinal extension of the gas generator 10.

Figure 3A:
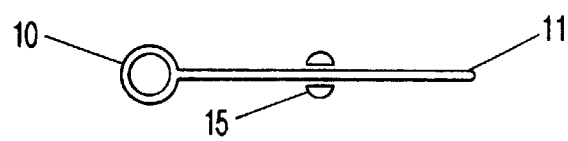
FIG. 3a The object of FIG. 3 in section along line III—III of FIG. 3.
Figure 4:
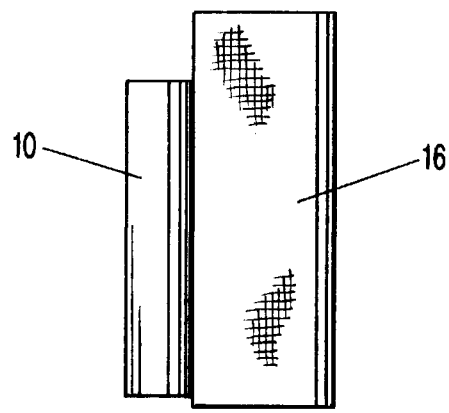
FIG. 4 The finished-folded airbag in a plan view.
Figure 4A:
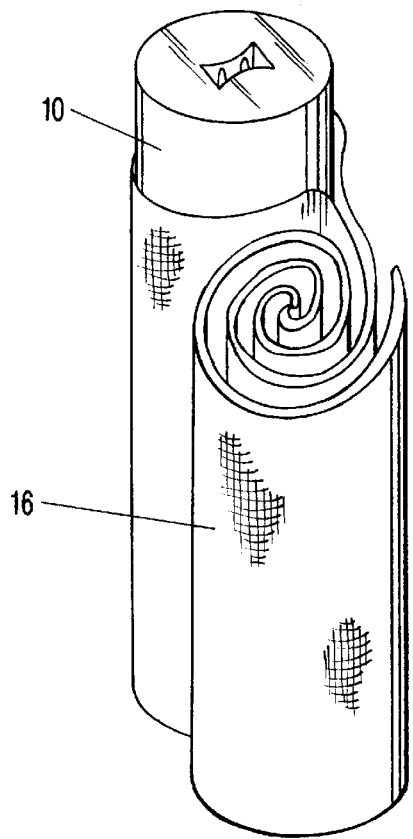
FIG. 4a The object of FIG. 4 in a perspective view.

The thus formed multi-layer fabric package formed from the tailored fabric 11 is then further folded by rolling by engaging the center of the thus formed fabric package by tool 15 in the form of a two-prong fork whereby one prong is positioned above and the other prong is positioned below the fabric package as can be seen especially in FIG. 3a. By rotation of the tool 15 in the form of a fork in the direction of the gas generator 10 a double-layer roll 16 (FIG. 4a) is formed whereby the portion of the fabric package positioned between the gas generator 10 and the tool 15 forms the inner roll while the portion of the fabric package positioned at the side of the tool 15 facing away from the gas generator is pulled in by rolling and thus forms the outer portion of the double layer. Subsequent to the rolling action of the tool 15, the tool 15 is laterally removed from the formed roll 16 so that the shape of the gas generator with attached folded-in airbag results, as shown in FIG. 4, respectively, 4a.

It is understood that according to the invention the partial folding steps carried out before rolling can be oriented and performed as a function of the geometrical shape of the tailored fabric 11 forming the airbag as well as of the shape of the gas generator 10 in any other suitable manner, whereby the thus prepared fabric package formed of the tailored fabric 11 is then finish-folded to a double-layer roll by rolling.

Figure 5:
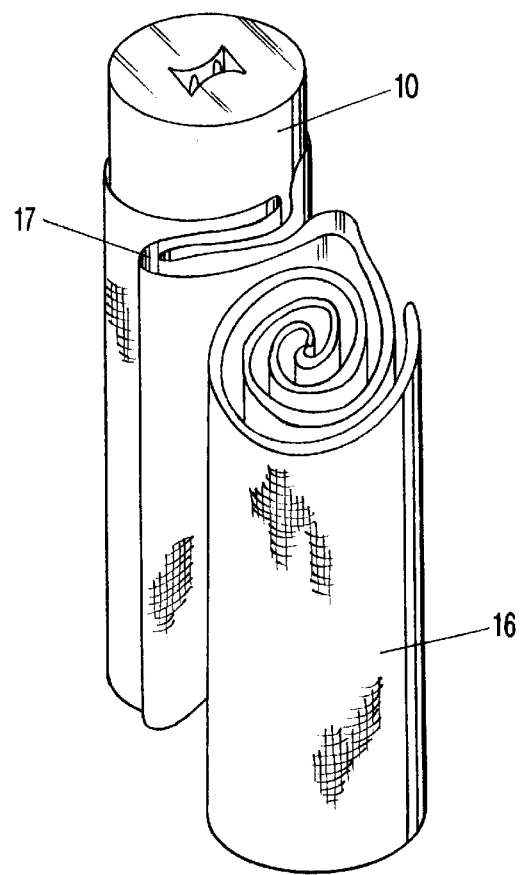

As can be seen in FIG. 5, it may be provided that between the roll 16 and the outer circumference of the gas generator a relief fold is arranged which is produced, for example, by interrupting the rolling step of the fabric 11 at a spacing to the gas generator 10 with a portion of flat fabric being positioned between the gas generator and the roll 16 and by then pushing the roll 16 against the circumference of the gas generator 10 so that the relief fold 17 is produced by pushing the tailored fabric section together.

The features of the object of these documents as disclosed in the above description, the claims, the abstract, and the drawings may be important individually or in any suitable combination for realizing the invention in its different embodiments.

The specification incorporates by reference the entire disclosure of German priority document 197 19 524.5 of May 9, 1997, and of International Application PCT/EP98/02664 of May 6, 1998.

The present invention is, of course, in no way restricted to the specific disclosure of the specification and drawings, but also encompasses any modifications within the scope of the appended claims.

What is claimed is:

1. A method for folding an airbag of an airbag system connected to a gas generator, said method comprising the steps of:
    a) laying out flat a tailored fabric (11) comprised of two fabric layers (12) defining the airbag volume;
    b) engaging a center of the laid out flat tailored fabric (11) with a tool (15);
    c) rotating the tool (15) in a direction toward the gas generator (10) so that a portion of the tailored fabric (11) disposed between the gas generator and the tool is rolled in a direction toward the gas generator (10) so that a portion of the tailored fabric (11) positioned at a side of the tool (15) facing away from the gas generator (10) is drawn into the resulting roll such that a double-layer roll (16) results; and
    d) removing the tool (15) from the roll (16).

2. A method according to claim 1, wherein the tool (15) is a two-prong fork, wherein, in said step b), one of the prongs is positioned above and the other prong is positioned below the tailored fabric (11).

3. A method according to claim 1, wherein the tailored fabric (11) extends from opposite sides of the gas generator (10), such that two portions of the tailored fabric (11) are provided on opposite sides of the gas generator (10), wherein in said steps b) and c) each one of said portions of the tailored fabric (11) is engaged by the tool (15) and rolled into a double-layer roll (16).

4. A method according to claim 1, further comprising the step of forming a relief fold (17) between the outer circumference of the gas generator (10) and the outer circumference of the roll (16) resting thereat.

5. A method according to claim 4, wherein, in said step c), rolling of the tailored fabric (11) is stopped at a spacing to the gas generator (10) and wherein in said step of forming a relief fold a portion of the tailored fabric (11) positioned between the gas generator (10) and the double-layer roll (16) is pushed together to form the relief fold (17).

6. A method according to claim 1, further including, before said step b), the step of folding inwardly at least a portion of the laid flat tailored fabric (11) by forming outer folding edges, wherein the tool (15) is in the form of rolling tongs.

7. A method according to claim 1, wherein the gas generator (10) is cylindrical and wherein the tailored fabric (11) is connected to one side of the gas generator (10) such that outer fabric portions (13, 14) of the tailored fabric (11) project laterally past a longitudinal extension of the cylindrical gas generator (10), wherein the method further includes, before said step b), the step of folding inwardly the outer fabric portions (13, 14) to form a multi-layer fabric package, wherein the tool (15) is in the form of rolling tongs.

8. A method according to claim 1, wherein the gas generator (10) is cylindrical and wherein the tailored fabric (11) is connected to one side of the gas generator (10) such that portions (13, 14) of the tailored fabric (11) project laterally past a longitudinal extension of the cylindrical gas generator (10), wherein the method further includes, before said step b), the steps of transforming one of the portions (13) by a folding aid, engaging parallel to the fabric layers (12), into an inwardly folded multi-layer fold arrangement and folding inwardly the other portion (14) of the tailored fabric (11) to form a multi-layer fabric package, wherein the tool (15) is in the form of rolling tongs.

* * * * *